United States Patent [19]
Nozaki

[11] Patent Number: 5,820,198
[45] Date of Patent: Oct. 13, 1998

[54] WEATHER STRIP FOR MOTOR VEHICLE AND METHOD FOR MANUFACTURING THE SAME

[75] Inventor: Masahiro Nozaki, Aichi-ken, Japan

[73] Assignee: Toyoda Gosei Co., Ltd., Aichi, Japan

[21] Appl. No.: 612,009

[22] Filed: Mar. 4, 1996

[30] Foreign Application Priority Data

| Mar. 3, 1995 | [JP] | Japan | ..................................... 7-070621 |
| Jun. 2, 1995 | [JP] | Japan | ..................................... 7-159979 |

[51] Int. Cl.⁶ ........................................................ B60J 10/08
[52] U.S. Cl. ........................................ 296/146.9; 49/500.1
[58] Field of Search ................................ 296/146.9, 202; 49/479.1, 489.1, 492.1, 493.1, 498.1, 500.1

[56] References Cited

U.S. PATENT DOCUMENTS

| 5,105,580 | 4/1992 | Akachi et al. ........................... 49/476.1 |
| 5,383,701 | 1/1995 | Okada ..................................... 296/146.9 |

FOREIGN PATENT DOCUMENTS

| 63-87311 | 4/1988 | Japan . |
| 3-169762 | 7/1991 | Japan . |
| 5-24439 | 2/1993 | Japan . |
| 6-135237 | 5/1994 | Japan . |
| 6-135238 | 5/1994 | Japan . |
| 6-191287 | 7/1994 | Japan . |
| 6-191288 | 7/1994 | Japan .................................... 296/146.9 |
| 6-219162 | 8/1994 | Japan . |
| 6-247224 | 9/1994 | Japan .................................... 296/146.9 |

*Primary Examiner*—Andrew C. Pike
*Attorney, Agent, or Firm*—Pillsbury Madison & Sutro, LLP

[57] ABSTRACT

A weather strip is used for a center pillar having a gradually increasing width downwardly along its length, and a roofline of a motor vehicle. The weather strip includes extruded front and rear roofline weather strips, extruded first and second center pillar weather strips, a molded portion which integrally joins the roofline weather strips and the center pillar weather strips, and a molding mounted on the molded portion between the center pillar weather strips. The center pillar weather strips gradually increase in spacing downwardly along the length of the center pillar. The molding gradually increases in width downwardly along the length of the center pillar. The extruded roofline weather strips are placed in a "T" configured mold, and the extruded center pillar weather strips are also placed in the molded but with the gradually increasing spacing. Material is injected molded between the weather strips to form the molded portion. The molding is fastened to the molded portion between the center pillar weather strips.

4 Claims, 3 Drawing Sheets

WEATHER STRIP FOR MOTOR VEHICLE AND METHOD FOR MANUFACTURING THE SAME

BACKGROUND OF THE INVENTION

1. Field of the Invention

The present invention relates to weather strip for use along a roof, including over the face of a center pillar between front and rear side windows of a motor vehicle, and to a method for manufacturing the same.

2. Description of the Prior Art

As shown in FIG. 1, weather strip 18 is attached along the side of a motor vehicle roof 10. The vehicle also includes a center pillar 12 on which weather strip 20 is attached. These weather strips 18,20 are connected each other by "T"-shaped connection 32.

As shown in FIGS. 2 and 3, weather strip 18 is comprised of a front portion 22 and a rear portion 24. The center pillar weather strip 20 is composed of two vertically extending side members including a first strip 26, adapted to seal the rear edge of a front door window pane 14, and a second strip 28, adapted to seal the front edge of a rear door window pane 16. The center pillar weather strip 20 also includes a center molding 30. The upper end of weather strip 20 is joined to the front and rear portions 22, 24 by an injection molded joint portion 32. Further, the lower end of the weather strip 20 includes an injection molded end portion 34. Weather strip for use on a center pillar can be manufactured by forming the first strip 26 and the second strip 28 as well as molding 30 integrally together as a unit, as set forth, for example, in Japanese Utility Model publication laid-open No. Hei 3-5625.

To conform the configuration of the center pillar weather strip 20 to that of the structure between the front and rear door openings on the side of the vehicle, the width of the center pillar gradually increases downwardly. However, where the first and second strips 26, 28 are formed integrally by extrusion, the cross section of such extruded weather strip pieces is uniform along their length and cannot be conformed to the gradually increasing width of the center pillar.

With the method of injecting the whole center weather strip without extruded strips, the molded weather strip can be conformed to a center pillar whose width gradually changes from its upper to lower areas. However, cores for forming tubular portions of the weather strip must be removed after molding thus lowering work efficiency.

SUMMARY OF THE INVENTION

It is an object of the present invention to provide a weather strip assembly that can be joined to other weather strips, particularly that used along a roof line and down a center pillar between front and rear doors on a vehicle. It is also an object to provide a center pillar weather strip construction that gradually increases in width downwardly along the length of the center pillar in conformity with the configuration of the center pillar structure.

Another object of the present invention is to provide an efficient method for manufacturing the above-described weather strip.

The invention comprises use of an extruded front and rear roof line weather strip separately, extruded first and second center pillar weather strips that are interconnected by an injection molded portion, and a substantially "T"-shaped molded member that engages the upper ends of the center pillar strips and the facing ends of the roof line strips.

The injection molded member interconnecting the first and second pillar strips allows the space therebetween to gradually increase along the length of such strips. By arranging the extruded strips in a mold, and thereafter injecting rubber material in the mold, the front and rear roof line strips and the first and second center pillar weather strips become joined to one another. This also forms a molded end portion at the lower ends of the first and second center pillar weather strips. A center pillar molding, prepared separately, is fixed to the molded portion between the first and second center pillar weather strips.

DETAILED DESCRIPTION OF THE PREFERRED EMBODIMENT

Figure 1:
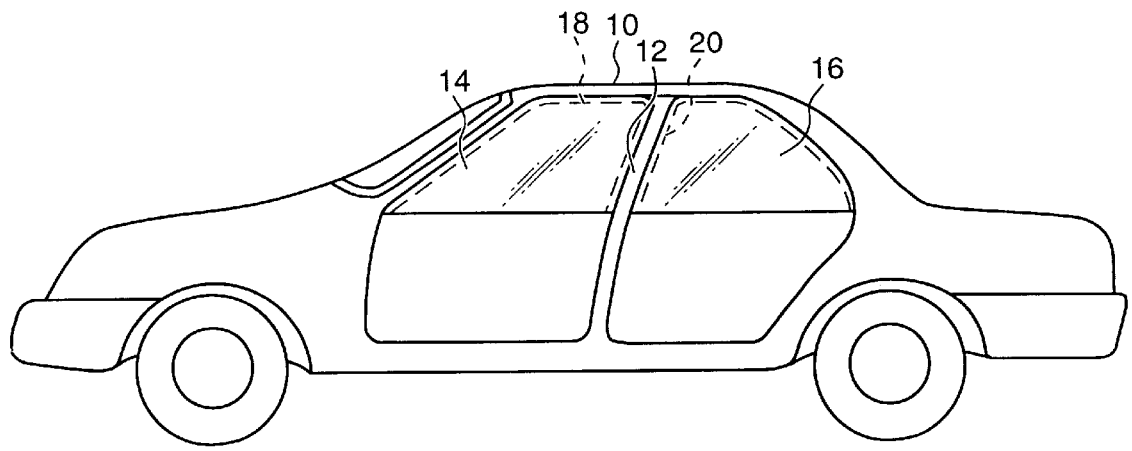
FIG. 1 is a side elevation view of a motor vehicle to which the present invention is applied.
Figure 2:
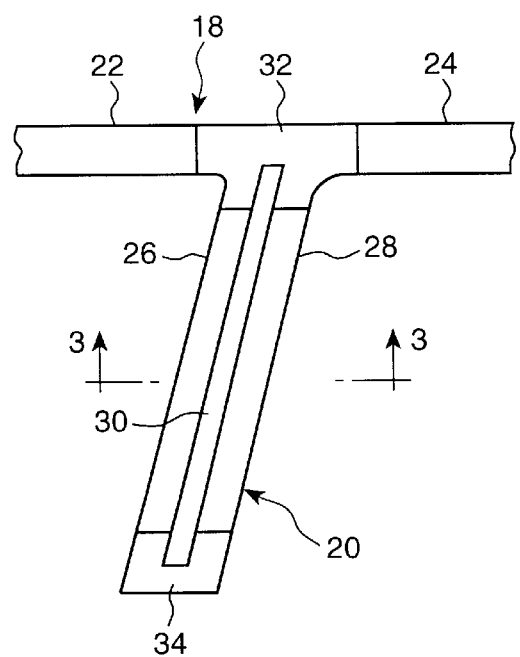
FIG. 2 is a front view of a conventional weather strip.
Figure 3:
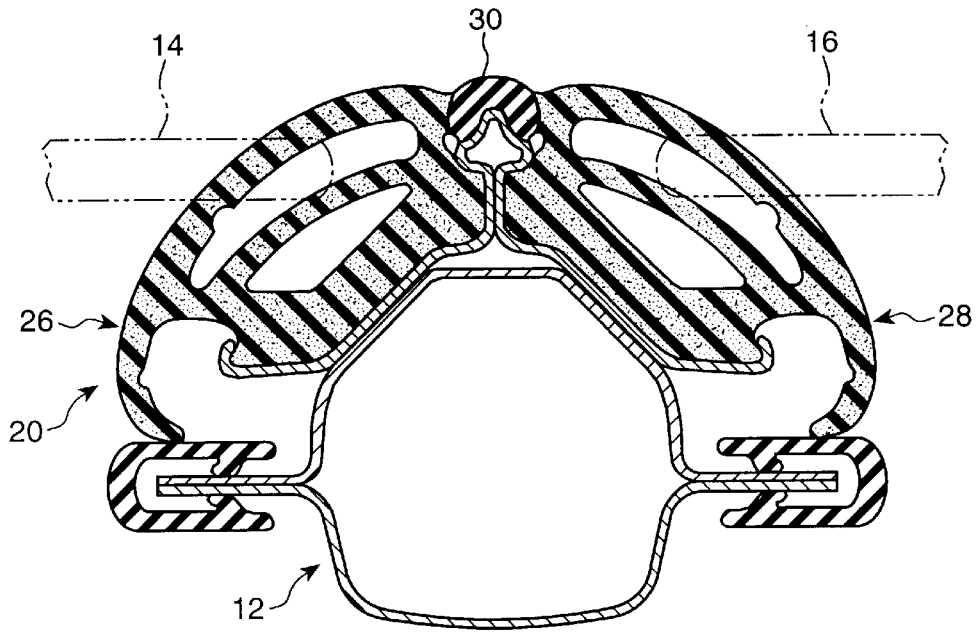
FIG. 3 is a cross-sectional view showing the attaching state of a conventional weather strip, taken along the line 3—3 of FIG. 2.
Figure 4:
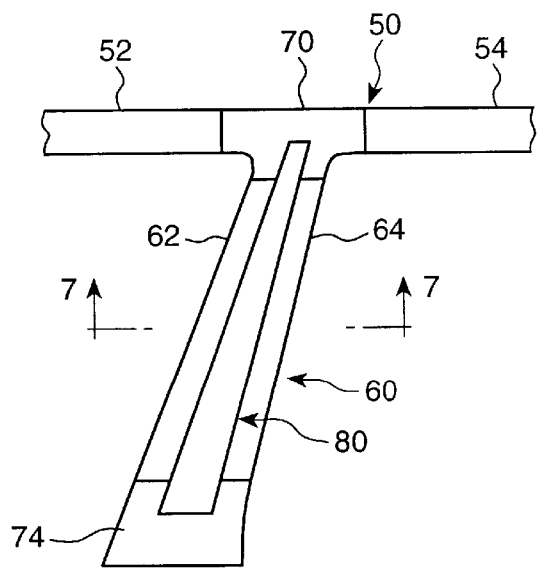
FIG. 4 is a front view of an embodiment of a weather strip in accordance with the present invention.
Figure 5:
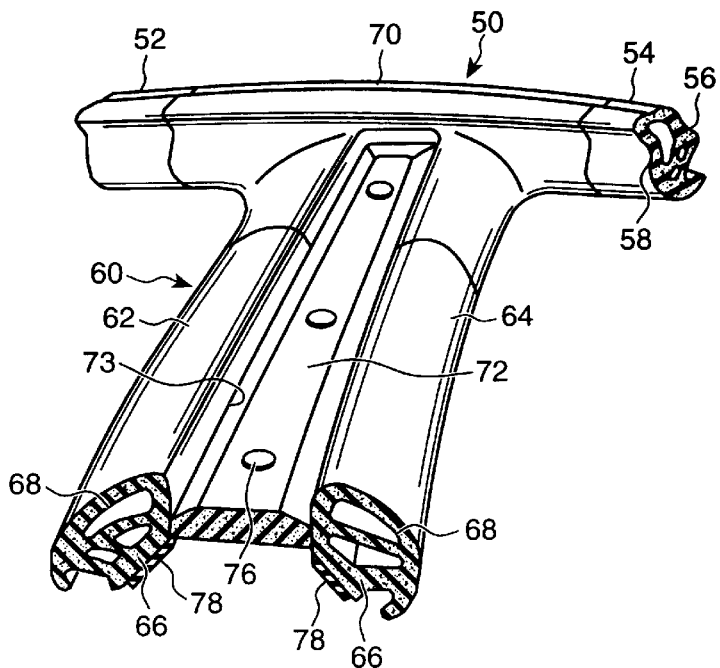
FIG. 5 is a perspective view of a main part of the embodiment of the weather strip.

As shown in FIGS. 4 and 5, a weather strip 50, for use along a vehicle roof line, includes a base portion 56 and tubular seal portion 58. A front roof weather strip is shown at 52 and a rear roof weather strip at 54. The front and rear roof weather strips 52, 54 are both extruded tubular bodies, preferably formed from sponge rubber and each having a substantially identical construction. A center pillar weather strip 60 comprises a first extruded center strip 62 and a second extruded center strip 64, formed from sponge rubber, and strip 60 has a width that gradually increases downwardly along the side of the vehicle. Each center strip also has a base portion 66 and a tubular seal portion 68.

The weather strip 50 and the center pillar weather strip 60 are joined integrally via an upper molded joint 70 having a "T" configuration, a center molded joint 72, and a lower molded joint 74. The upper molded joint 70 has a horizontal portion, joined to the ends of extruded roof weather strips 52, 54, and a vertical portion, diverging downwardly from the horizontal portion and joined to the ends of the extruded center strips 62, 64 formed from sponge rubber. The center molded joint 72 extends between and interconnects both base portions 66 of the center strips 62, 64 and joins them into an integral unit. The width of the center molded joint 72 gradually increases downwardly along the strips 62 and 64 so that an inset or recessed groove 73 is formed, the width of which gradually increases along its length from top to bottom. The center molded joint 72 includes a plurality of holes 76 that are spaced apart down the center of the molded material. The lower molded joint 74 is formed to close tubular seal portions 68 at the lower end of the center strips 62, 64.

Figure 6:
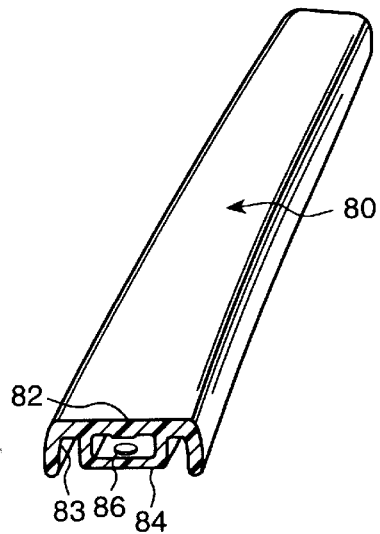
FIG. 6 is a perspective view of a center pillar molding.

A center pillar molding 80 is fixed in the groove 73 between both center strips 62, 64. To properly fit in groove 73 the width of the center pillar molding 80 also gradually increases from its top toward its bottom end. The center pillar molding 80 is preferably made of resin and is formed by injection molding techniques. As shown of FIGS. 6 and 7, the center pillar molding 80 comprises a main body 82 and fastening portions 84 that depend from the interior surface 83 of body 82. Portion 84 is provided with a plurality of holes 86 that are spaced and positioned to correspond to the placement of holes 76 in the center molded joint 72. The fastening portions 84 are preferably located in the center body 82.

Figure 7:
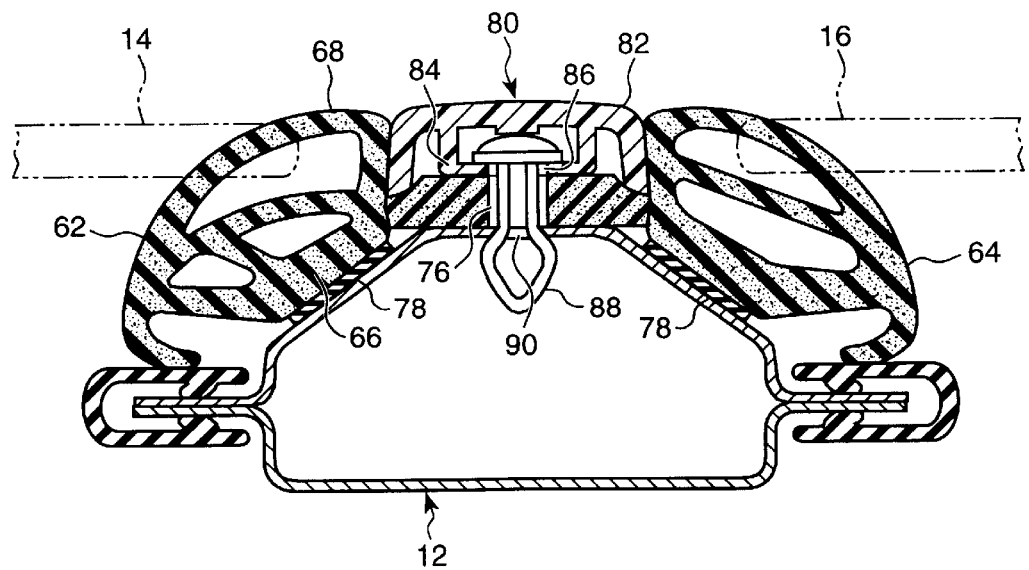
FIG. 7 is a cross-sectional view showing the attaching state of the weather strip, taken along the line 7—7 of FIG. 4.

As shown of FIG. 7, the center pillar weather strip 60 and the center pillar molding 80 are fixed to the center pillar 12 by using a plurality of fasteners 88 that have been previously inserted into holes 86 of fastening portions 84. The fasteners 88 are inserted through holes 76 of the center molded joint 72 and into holes 90 of the center pillar 12, so that the center pillar weather strip 60 is secured to the center pillar 12. Strips of double-sided adhesive tapes 78, protected by cover tapes (not shown), are attached along the inside surface of each base portion 66 of both extruded center pillar strips 62, 64. The base portions 66 of the extruded weather strips 62, 64 can then be mounted on front and rear slanting surfaces of the center pillar 12 with these double-sided adhesive tapes 78. Therefore, the center pillar weather strip 60 is attached to the center pillar 12. At this time, both side walls of the center pillar molding body 82 contact the facing side surface of both extruded center pillar strips 62, 64. Both ends of the side walls of the main body 82 of the center pillar molding 80 are pressed against the center molded joint 72. Hence, the sealing efficiency between the center pillar strip 60 and the center pillar molding 80 is maintained.

The roof line weather strip 50 is set into a retainer (not shown) along the door opening of the roof 18 or is attached directly along the roof 18 of the door opening with a double-sided adhesive tape 78.

The present invention of the weather strip is manufactured as the following.

The ends of the extruded roof line weather strips 52, 54 are placed in a mold cavity so that their ends are facing toward the interior of the mold cavity. The upper ends of the first and second extruded center pillar weather strips 62, 64 are also placed in the mold cavity below the extruded roof line weather strips 52, 54. As placed in the mold cavity, the width of these extruded center weather strips 62, 64 gradually increases along the length of the cavity.

Then, the molded joint material of the substantially same quality of the extruded weather strip molding material is injected into the cavity. Upon opening the mold cavity, the upper molded joint 70, the center molded joint 72, and lower end molded joint 74 integrally join the extruded roof line weather strips 52, 54 and the extruded center pillar weather strips 62, 64 together. Holes 76 are formed during molding or are formed after molding.

What is claimed is:

1. An integral weather strip assembly comprising:

first and second weather strips extending outwardly from the assembly, each having an interior end portion that face each other and which are spaced apart;

a pair of spaced-apart weather strips having upper ends, lower ends, and facing side walls, said upper ends being spaced from said interior end portions of said first and second weather strips, respectively, wherein a distance between said pair of spaced-apart weather strips gradually increases from said upper ends toward said lower ends;

a molded member interconnecting said interior end portions, said upper ends, said lower ends, and at least portions of said facing side walls; and a molding mounted on said molded member between said pair of said spaced-apart weather strips, said molding gradually increasing in width from said upper ends toward said lower ends, said molding covering the entire molded member between said spaced-apart weather strips.

2. The integral weather strip assembly according to claim 1, wherein each of said spaced-apart weather strips further includes an inside surface, and said assembly further comprises double-sided adhesive tapes positioned along at least a portion of said inside surfaces.

3. The integral weather strip assembly according to claim 1, wherein said pair of said spaced-apart weather strips are adapted to be attached to a center pillar of a motor vehicle.

4. The integral weather strip assembly according to claim 1, wherein said first and second weather strips and said pair of said spaced-apart weather strips are extruded from sponge rubber.

\* \* \* \* \*